(12) United States Patent
Gonzalez et al.

(10) Patent No.: US 8,907,566 B2
(45) Date of Patent: Dec. 9, 2014

(54) ELECTRICAL CONNECTION DEVICE FOR A HEADLAMP

(71) Applicant: Valeo Iluminacion Sociedad Anonima, Martos (ES)

(72) Inventors: Maria Marin Gonzalez, Martos (ES); Rafael Nicolas Mariscal, Jaen (ES); Antonio Illan Cabeza, Martos (ES); Juan Lara Cabeza, Martos (ES)

(73) Assignee: Valeo Iluminacion Sociedad Anonima, Martos (ES)

( * ) Notice: Subject to any disclaimer, the term of this patent is extended or adjusted under 35 U.S.C. 154(b) by 0 days.

(21) Appl. No.: 14/061,969

(22) Filed: Oct. 24, 2013

(65) Prior Publication Data

US 2014/0117850 A1    May 1, 2014

(30) Foreign Application Priority Data

Oct. 26, 2012 (FR) ...................................... 12 60241

(51) Int. Cl.
| | |
|---|---|
| *H05B 37/02* | (2006.01) |
| *B60L 1/14* | (2006.01) |
| *H05B 33/08* | (2006.01) |
| *B60Q 1/04* | (2006.01) |
| *B60Q 1/00* | (2006.01) |

(52) U.S. Cl.
CPC ... *B60Q 1/04* (2013.01); *B60L 1/14* (2013.01); *H05B 33/0845* (2013.01); *H05B 37/02* (2013.01); *B60Q 1/00* (2013.01)
USPC ............................................. 315/82; 315/294

(58) Field of Classification Search
CPC .................................. H05B 37/02; B60Q 1/04
USPC ....................................... 315/81, 82, 294, 297
See application file for complete search history.

(56) References Cited

U.S. PATENT DOCUMENTS

| | | | |
|---|---|---|---|
| 6,414,437 B1 | 7/2002 | Diez et al. | |
| 8,525,416 B2 | 9/2013 | Roger et al. | |
| 2008/0029701 A1* | 2/2008 | Onozawa et al. | ............. 250/332 |
| 2011/0260615 A1 | 10/2011 | Roger et al. | |
| 2013/0169154 A1* | 7/2013 | Kay et al. | ......................... 315/81 |
| 2014/0111087 A1* | 4/2014 | Kurebayashi | ................... 315/82 |

FOREIGN PATENT DOCUMENTS

FR            2959181         10/2011

* cited by examiner

*Primary Examiner* — Don Le
(74) *Attorney, Agent, or Firm* — Jacox, Meckstroth & Jenkins

(57) ABSTRACT

An electrical connection device for the connection between an electronic control unit (M) and an automotive vehicle headlamp. The electronic control unit has at least one control output (Mc) and a power supply output (Mp), the headlamp comprising at least one first module comprising a first control circuit having at least one power input ($1p$), the first module being able to generate a first light function, and a second module comprising a second control circuit having at least one power input ($2p$) and a control input ($2c$), the second module being able to selectively generate at least one second light function, the first and second control circuits being intended to be controlled by the electronic control unit (M), the electrical connection device being characterized in that it comprises at least:
  one power supply line (Lp) intended to connect the power supply output (Mp) of the electronic control unit (M) to the power input ($1p$) of the first control circuit and to the power input ($2p$) of the second control circuit; and
  a first control line (Lc) intended to connect the control output (Mc) of the electronic control unit (M) to the control input ($2c$) of the second control circuit.

24 Claims, 3 Drawing Sheets

ELECTRICAL CONNECTION DEVICE FOR A HEADLAMP

CROSS-REFERENCE TO RELATED APPLICATIONS

This application claims priority to French Application No. 1260241 filed Oct. 26, 2012.

BACKGROUND OF THE INVENTION

1. Field of the Invention

The invention relates to an electrical connection device for a headlamp, especially a front headlamp, for an automotive vehicle.

2. Description of the Related Art

The headlamps of present-day modern automotive vehicles most often comprise, as shown in FIG. 1A, a first module 1 able to generate what is called a style light function such as, for example, an eyebrow light. This function and the corresponding module are also denoted by the acronym DGL for "design guide line" insofar as the aforementioned DGL eyebrow light makes it possible to give the module a brand signature specific to the automotive vehicle manufacturer.

Apart from the aforementioned eyebrow light style function, present-day headlamps generally comprise at least one second module 2 able to selectively produce two illuminating and/or signaling functions such as a DRL (daytime running light) function and a PL (position light) function.

The DRL/PL module may be arranged in the form of rings placed adjacent each other in the direction of the horizontal plane of symmetry of the headlamp, as shown in FIG. 1A.

To control the aforementioned headlamps, the control architecture currently used customarily comprises, as shown in FIG. 1B, an electronic control unit M arranged to control the on/off state of one of the DRL or PL illuminating/signaling functions via the second module 2 and the on/off state of the DGL style function via the first module 1.

Usually, the electronic control unit M comprises at least:
an electrical supply output Mp1 for the first module 1, which output Mp1 is connected to a power input 1p of a control circuit 11 of the first module 1;
an electrical supply output Mp2 for the second module 2, which output Mp2 is connected to a power input 2p of a control circuit 21 of the second module 2; and
a control output Mc for control of the second module 2, which output Mc is connected to a control input 2c of a control circuit 21 of the second module 2.

Thus, the output Mc delivers, over the control line Lc, a signal for switching between the DRL daytime running light function and the PL position light function.

Because the standards and regulations pertaining to automotive vehicle illuminating/signaling functions are continuously changing and new functions regulating implementation of the latter are constantly appearing, it seemed advisable to simplify, or at the very least to reduce, the number of connection lines ensuring the connection between the electronic control unit M and the control circuits 11 and 21 of the headlamp, with the aim, in particular, of freeing up one of the outputs of the electronic control unit M while preserving all of the functionalities of a conventional headlamp, such as, for example, the selection of one illuminating and/or signaling function or even the detection and control of system failures.

SUMMARY OF THE INVENTION

The aim of the invention is, in particular, to solve the aforementioned problem.

One subject of the invention is therefore an electrical connection device for the connection between an electronic control unit M and an automotive vehicle headlamp, the electronic control unit M comprising at least one control output and a power supply output, the headlamp comprising at least one first module 1 comprising a first control circuit having at least one power input, the first module being able to generate a first light function, and a second module 2 comprising a second control circuit having at least one power input and a control input, the second module 2 being able to selectively generate at least one second light function, the first and second control circuits being intended to be controlled by the electronic control unit M, the electrical connection device comprising at least:
one power supply line intended to connect the power supply output of the electronic control unit M to the power input of the first control circuit and to the power input of the second control circuit; and
a first control line intended to connect the control output of the electronic control unit M to the control input of the second control circuit.

The power supply line allows the power supply delivered by the electronic control unit M to be shared between the control circuit of the first module 1 and between the control circuit of the second module 2.

The electrical connection device according to the invention therefore only uses two outputs of a control unit to control a headlamp.

Advantageously, the first control circuit having a control input and the second control circuit having a control output, the connection device comprises a second control line intended to connect the control input of the first control circuit to the control output of the second control circuit.

This second control line has the advantage of allowing all of the functionalities of a conventional headlamp to be provided, especially control of the headlamp in the case of system failure.

Another subject of the invention is a control device intended to control a vehicle headlamp, this device comprising:
an electronic control unit M; and
an electrical connection device according to the invention.

The control device according to the invention will possibly furthermore have at least one of the following optional features:
have at least one of the following optional features:
the control device comprises diagnostic means able to diagnose failure of the second module 2, especially failure of an electrical component of the second module 2;
the diagnostic means are integrated into the electronic control unit M;
the diagnostic means are arranged in order to diagnose failure of the second module 2 by comparing a characteristic value, especially a magnitude, of the supply current flowing in the power supply line to at least one specific reference value; and
the diagnostic means are arranged in order to diagnose failure of the second module 2 when the magnitude of the supply current flowing in the power supply line drops below a threshold value, especially 25 mA.

The expression "failure of an electrical component of the second module" is especially understood to mean failure of at least one component of this module, for example a light-emitting diode of this module or even the control circuit of this model.

Another subject of the invention is an automotive vehicle headlamp comprising:

a first module comprising a first control circuit having at least one power input, the first module being able to generate a first light function;

a second module comprising a second control circuit having at least one power input and a control input, the second module being able to selectively generate at least one second light function; and an electrical connection device according to the invention, this connection device being connected to the first and second modules.

Thus, the first module generates the first light function when it is electrically powered via the power supply line.

The second module 2 turns on the second function when the module is electrically powered via the power supply line and the electronic control unit M transmits a signal commanding it to turn on the second function over the first control line.

The headlamp according to the invention will furthermore optionally have at least one of the following features:

the headlamp comprises control means intended to deactivate the first module 1 when the second module 2 is diagnosed to have failed, especially via interruption of the electrical supply of the first module 1;

the control means are integrated into the second control circuit of the second module 2;

the first control circuit having a control input, the second control circuit having a control output, and the electrical connection device comprising a second control line connecting the input of the first control circuit to the output of the second control circuit, the control means are able to generate a voltage drop across the second control line when the second module 2 is diagnosed to have failed;

the first control circuit of the first module comprises at least:

a current regulating circuit (REG) comprising a pulse modulated input, and a connection line between the control input of the first control circuit and the pulse modulated input of the regulator, the voltage drop over the diagnostic line (DL) causing the second module to deactivate, especially via interruption of the electrical supply of the second module 2;

the headlamp comprises an electronic control unit M connected to the electrical connection device;

the first module 1 and/or the second module 2 comprises at least one light-emitting diode;

the first light function is a style function;

the second light function is a preset illuminating and/or signaling function, especially a daytime running light or DRL function; and the second module 2 is able to selectively generate a third light function, this third function being a preset illuminating and/or signaling function distinct from the second light function, especially a position light function.

In this way, the second module 2 turns on the third function when the module is electrically powered via the power supply line and the electronic control unit M transmits a signal commanding the third function to be turned on over the first control line.

The expression "style function" is understood to mean an aesthetic function providing no photometric function.

These and other objects and advantages of the invention will be apparent from the following description, the accompanying drawings and the appended claims.

BRIEF DESCRIPTION OF THE ACCOMPANYING DRAWINGS

The expression "deactivation of a module" is especially understood to mean deactivating light emission from this module.

The electrical connection device, the control device and the headlamp, i.e. the subject matter of the invention, will be better understood on reading the following description and with a view to the drawings.

DETAILED DESCRIPTION OF THE PREFERRED EMBODIMENTS

Figure 2:
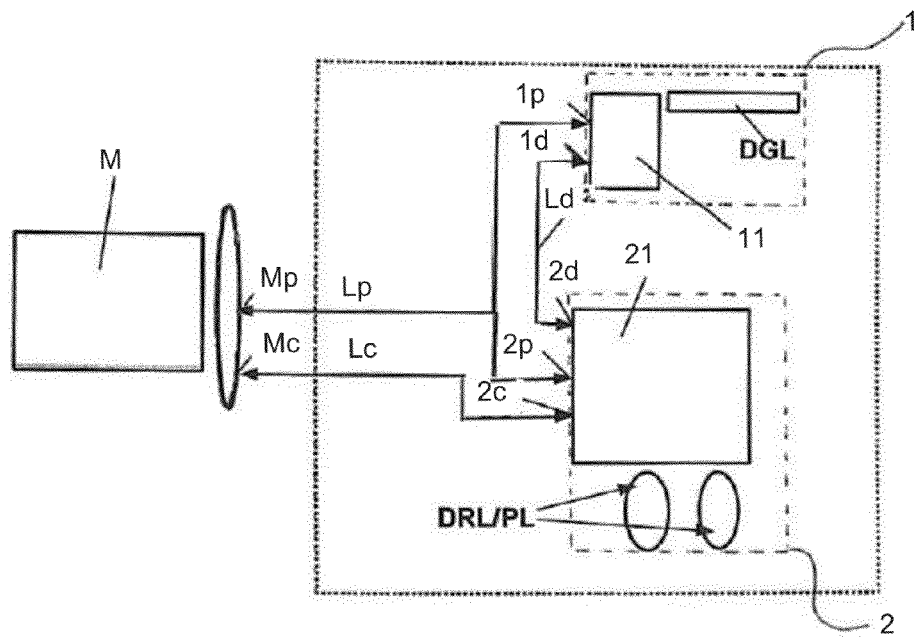
FIG. 2 shows a preferred nonlimiting functional diagram of a headlamp according to the subject matter of the present invention.

A more detailed description of an automotive vehicle headlamp, according to the subject matter of the present invention, will now we given with regard to FIG. 2 and the subsequent figures.

The automotive vehicle headlamp comprises at least one first module 1 able to generate a first light function DGL, and one second module 2 able to selectively generate a second light function DRL or a third light function PL. The headlamp is controlled by an electronic control unit M.

Figure 1A:
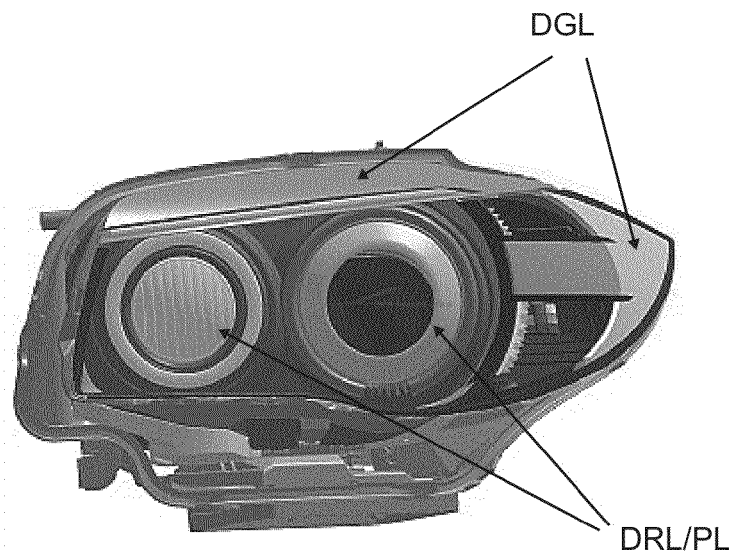
FIGS. 1A and 1B show modules according to the prior art.
Figure 1B:
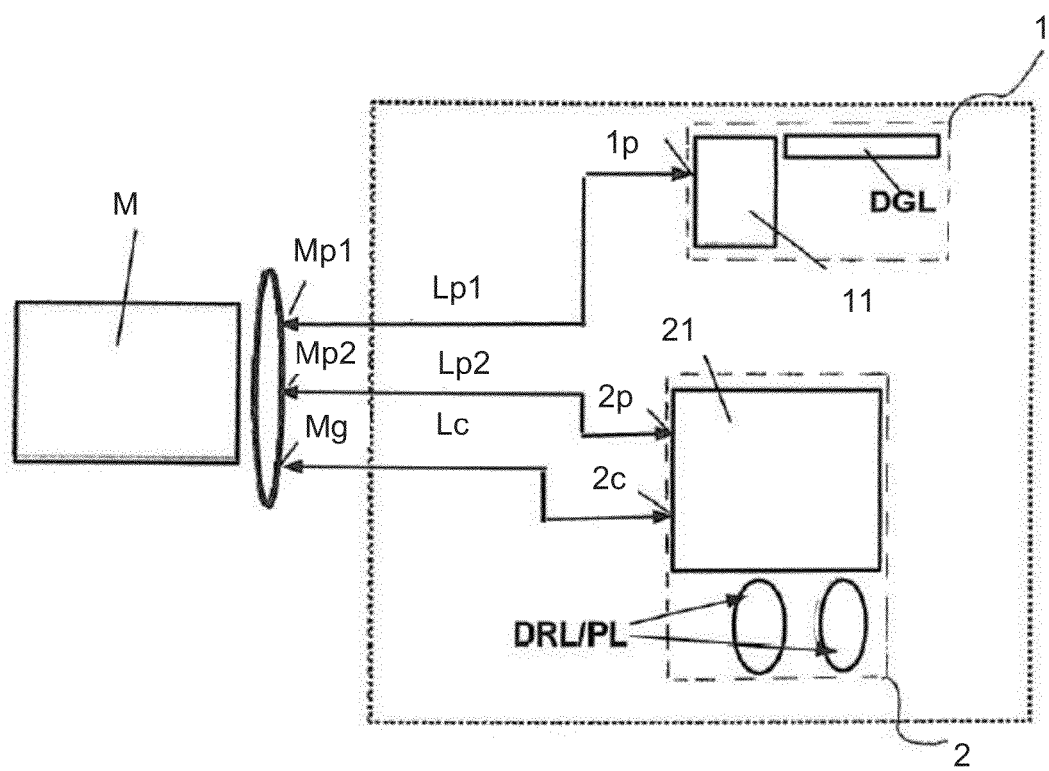

With the aim of achieving complete legacy compatibility with present-day modern vehicles as yet unequipped with an electrical connection device for an automotive vehicle headlamp according to the subject matter of the present invention, the electronic control unit M is identical to that described with regard to FIG. 1B. The electronic control unit M thus comprises a control output Mc, a power supply outlet Mp and another power supply outlet (not shown).

The first module 1 comprises a first control circuit 11 having at least one power input $1p$.

The second module 2 comprises a second control circuit 21 having a power input $2p$ and a control input $2c$.

The connection device comprises:

a power supply line Lp intended to connect the power supply output Mp of the electronic control unit M to the power input $1p$ of the first control circuit 11 and to the power input $2p$ of the second control circuit 21; and a first control line Lc connecting the control output Mc of the electronic control unit M to the control input $2c$ of the second control circuit 21.

This shared supply line Lp in fact allows it to be ensured that the power supply delivered by the electronic control unit M is shared between the control circuit 11 of the first module 1 and between the control circuit 21 of the second module 2.

This thus makes it possible to free up the other electrical supply output of the electronic control unit M, referenced Mp2 in FIG. 1B.

This freed up output may then be reallocated to the control of any other suitable illuminating/signaling function simply by reprogramming the constituent electronic microcircuits and/or controller of the electronic control unit M.

According to the invention, the first module 1 generates the first light function DGL when the first module 1 is electrically powered via the power supply line Lp.

The second module 2 turns on the second function DRL when the second module 2 is electrically powered via the power supply line Lp and the electronic control unit M transmits a signal commanding it to turn on the second function DRL over the first control line Lc.

The second module 2 turns on the second function PL when the second module 2 is electrically powered via the power supply line Lp and the electronic control unit M transmits a signal commanding it to turn on the third function PL over the first control line Lc.

Furthermore, the electronic control unit M comprises diagnostic means (not shown) able to diagnose failure of the second module 2.

By way of nonlimiting example, the diagnostic means are arranged in order to diagnose failure of the second module 2, when a signal commanding the second function DRL to be turned on is being transmitted over the first control line Lc, by comparing a magnitude, of the supply current flowing in the power supply line Lp, to at least one specific reference value.

This reference value below which the supply current flowing in the power supply line Lp is considered to have failed may be set equal to 25 milliamps. In this situation, the electronic control unit M diagnoses with certainty failure of the second module 2. It may then be desirable for the electronic control unit M to trigger an alarm signal, for example in the passenger compartment of the vehicle.

Advantageously, the diagnostic means are arranged in order to compare the magnitude of the supply current flowing in the power supply line Lp to a second specific reference value.

This second reference value above which the value of the supply current delivered by the shared connection is considered not to have failed may be set equal to 330 milliamps. This value corresponds to the magnitude of the current normally delivered during correct operation of the first and second modules.

In this embodiment, no diagnosis is carried out by the diagnostic means when a signal commanding the third function PL to turn on is being transmitted over the first control line Lc.

The second control circuit 21 of the second module 2 comprises control means, not shown, intended to deactivate the first module 1 when failure of the second module 2 is diagnosed, especially via interruption of the electrical supply of the first module 1.

The first control circuit 11 has a control input 1d and the second control circuit 21 has a control output 2d, and the electrical connection device comprises a second control line Ld connecting this control input 1d to the control output 2d of the second control circuit 21. The control means are able to generate a voltage drop over this second control line Ld when failure of the second module 2 is diagnosed.

The existence of this second control line Ld allows a process for controlling diagnosis of the control circuits 11 and 21 to be executed under similar conditions to those found in the electrical connection architectures of prior-art automotive vehicle headlamps such as shown in FIG. 1B.

It will in particular be understood that therefore, by virtue of the control compatibility of the aforementioned diagnosis, it is possible to install the electrical connection device for an automotive vehicle headlamp according to the subject matter of the present invention during manufacture of the vehicle or afterward during a simple replacement of an automotive vehicle headlamp, the illuminating/signaling function controlled by the free output of the electronic control unit M then possibly being modified simply by reprogramming this module, as was mentioned above.

Figure 3:
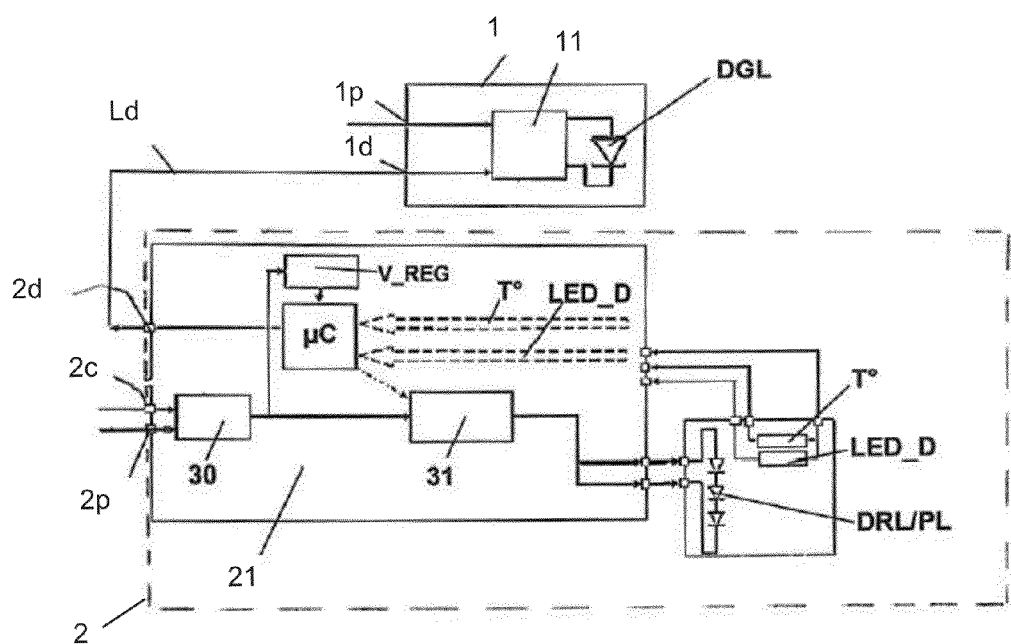
FIG. 3 shows, by way of nonlimiting example, in greater detail, the headlamp in FIG. 2.
Figure 4:
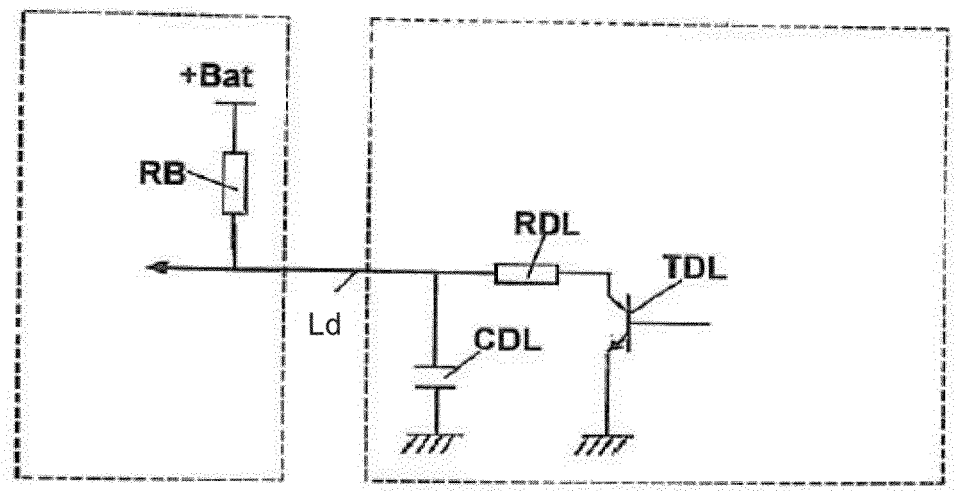
FIG. 4 shows, by way of nonlimiting example, a detail of an embodiment of the connection device of the headlamp in FIG. 3.
Figure 5:
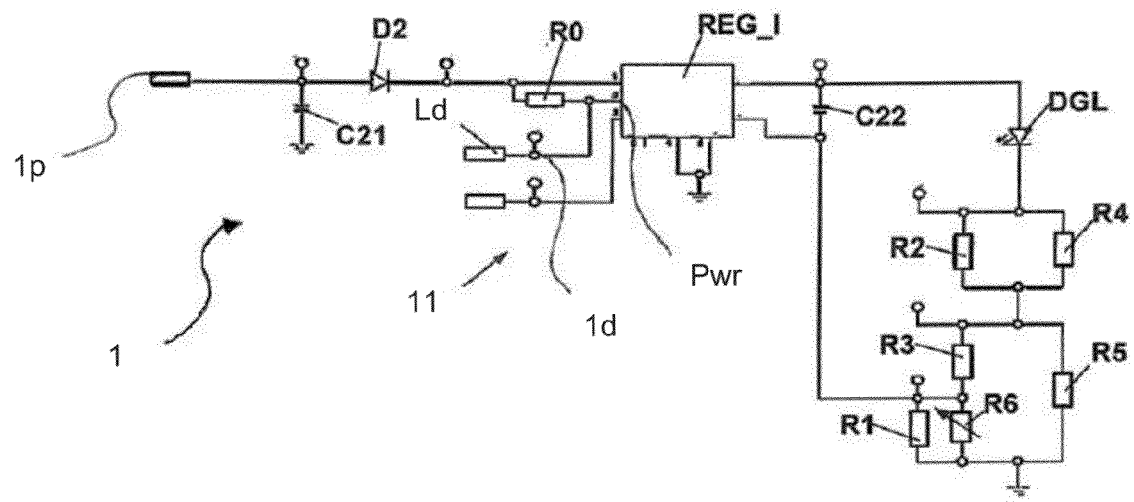
FIG. 5 shows, by way of nonlimiting example, a complete schematic of an embodiment of the first module 1 of the headlamp in FIG. 3.

A more detailed description of the hardware architecture of the first module 1 and of the second module 2 at the component level is now given with regard to FIGS. 3, 4 and 5.

With reference to FIG. 3, the first module 1 comprises a control circuit 11 for controlling a light-emitting diode DGL. The power supply line Lp is connected to the power input 1p of the aforementioned control circuit 11, and the second control line Ld is connected to the control input 1d of the aforementioned control circuit 11.

The second module 2 comprises a control circuit 21 that advantageously comprises a circuit, given the reference 30, for protecting from transient effects, the power supply line Lp being connected to the power input 2p of this circuit, and the first control line Lc being connected to the control input 2c of this circuit. This circuit 30 controls a control circuit 31 that controls three light-emitting diodes DRL/PL. The temperature and brightness of the latter are for example controlled via a temperature gauge, denoted T°, and via a light flux detector LED_D. The latter allow the assembly to be controlled by way of a microcontroller µC that is powered by way of a voltage regulator, denoted V_REG. The aforementioned microcontroller µC is able to generate a control signal when failure of a component of the second module 2 is detected, for example taking the form of a voltage drop. The microcontroller then transmits this control signal over the second control line Ld by way of an interface circuit, such as shown in FIG. 4.

With reference to the aforementioned FIG. 4, and by way of nonlimiting example, the actual interface comprises a transistor, denoted TDL, directly controlled by the microcontroller µC and controlling an RC circuit containing a resistor RDL and a capacitor CDL connected to the second control line Ld, which line is loaded with a resistance RB directly connected to the positive voltage +Bat of the battery of the vehicle.

Lastly, with reference to FIG. 5, one nonlimiting embodiment of the control circuit 11 of the first module 1 is shown. This control circuit comprises a pulse modulated current regulator, denoted REG_I, the pulse modulated input PWM of which is connected to the control input 1d. The voltage drop over the second control line Ld thus causes the first module 1 to deactivate via interruption of the electrical supply of the first module.

In FIG. 5, the resistors R0 to R5 and the capacitors C21 and C22 have resistances and capacitances, respectively, that are adapted to the type of current regulator chosen in order to ensure the bias and operation of the first module 1, and the variable resistor R6 allows the operating point of the first module 1 to be adjusted.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An electrical connection device for the connection between an electronic control unit (M) and an automotive vehicle headlamp, the electronic control unit (M) comprising at least one control output (Mc) and a power supply output (Mp), the automotive vehicle headlamp comprising at least one first module comprising a first control circuit having at least one power input (1p), the first module being able to generate a first light function, and a second module comprising a second control circuit having at least one power input ($2p$) and a control input ($2c$), the second module being able to selectively generate at least one second light function, the first and second control circuits being intended to be controlled by the electronic control unit (M), wherein the electrical connection device comprises at least:

B-one power supply line (Lp) intended to connect the power supply output (Mp) of the electronic control unit (M) to the power input ($1p$) of the first control circuit and to the power input ($2p$) of the second control circuit; and a first control line (Lc) intended to connect the control output (Mc) of the electronic control unit (M) to the control input ($2c$) of the second control circuit.

2. The electrical connection device according to claim 1, the first control circuit having a control input ($1d$) and the second control circuit having a control output ($2d$), wherein it comprises a second control line (Ld) intended to connect the control input ($1d$) of the first control circuit to the control output ($2d$) of the second control circuit.

3. The electrical connection device intended to control the automotive vehicle headlamp, wherein it comprises:
an electronic control unit (M); and
an electrical connection device according to claim 1.

4. The electrical connection device according to claim 3, wherein it comprises diagnostic means able to diagnose failure of the second module, especially failure of an electrical component of the second module.

5. The electrical connection device according to claim 4, wherein the diagnostic means are integrated into the electronic control unit (M).

6. The electrical connection device according to claim 4, wherein the diagnostic means are arranged in order to diagnose failure of the second module by comparing a characteristic value, especially a magnitude, of the supply current flowing in the power supply line (Lp) to at least one specific reference value.

7. The electrical connection device according to claim 6, wherein the diagnostic means are arranged in order to diagnose failure of the second module when the magnitude of the supply current flowing in the power supply line (Lp) drops below a threshold value, especially 25 mA.

8. An automotive vehicle headlamp comprising:
a first module comprising a first control circuit having at least one power input ($1p$), the first module being able to generate a first light function;
a second module comprising a second control circuit having at least one power input ($2p$) and a control input ($2c$), the second module being able to selectively generate at least one second light function; and
an electrical connection device according to claim 1, this connection device being connected to the first and second modules.

9. The automotive vehicle headlamp according to claim 8, wherein it comprises control means (µC) intended to deactivate the first module when the second module is diagnosed to have failed, especially via interruption of the electrical supply of the first module.

10. The automotive vehicle headlamp according to claim 9, wherein the control means (µC) are integrated into the second control circuit of the second module.

11. The automotive vehicle headlamp according to claim 9, wherein the first control circuit has a control input ($1d$) and the second control circuit has a control output ($2d$), in that it comprises a second control line (Ld) connecting the control input ($1d$) of the first control circuit to the control output ($2d$) of the second control circuit, and in that the control means are able to generate a voltage drop across the second control line when the second module is diagnosed to have failed.

12. The automotive vehicle headlamp according to claim 11, wherein the first control circuit of the first module comprises at least:
a current regulating circuit (REG_I) comprising a pulse modulated input (PWM); and
a connection line between the control input ($1d$) of the first control circuit and the pulse modulated input (PWM) of the regulator, the voltage drop over the second control line (Ld) causing the first module to deactivate, especially via interruption of the electrical supply of the first module.

13. The automotive vehicle headlamp according to claim 8, wherein the first module and/or the second module comprises at least one light-emitting diode.

14. The automotive vehicle headlamp according to claim 8, wherein the first light function is a style function.

15. The automotive vehicle headlamp a according to claim 8, wherein the second light function is a preset illuminating and/or signaling function, especially a daytime running light function.

16. The automotive vehicle headlamp according to claim 15, wherein the second module is able to generate a third light function, this third function being a preset illuminating and/or signaling function distinct from the second light function, especially a position light function.

17. The automotive vehicle headlamp according to claim 8, wherein it comprises an electronic control unit (M) connected to the electrical connection device.

18. The electrical connection device intended to control the automotive vehicle headlamp, wherein it comprises:
an electronic control unit (M); and
an electrical connection device according to claim 2.

19. The electrical connection device according to claim 5, wherein the diagnostic means are arranged in order to diagnose failure of the second module by comparing a characteristic value, especially a magnitude, of the supply current flowing in the power supply line (Lp) to at least one specific reference value.

20. An automotive vehicle headlamp comprising:
a first module comprising a first control circuit having at least one power input ($1p$), the first module being able to generate a first light function;
a second module comprising a second control circuit having at least one power input ($2p$) and a control input ($2c$), the second module being able to selectively generate at least one second light function; and
an electrical connection device according to claim 2, this connection device being connected to the first and second modules.

21. The automotive vehicle headlamp according to claim 10, wherein the first control circuit has a control input ($1d$) and the second control circuit has a control output ($2d$), in that it comprises a second control line (Ld) connecting the control input ($1d$) of the first control circuit to the control output ($2d$) of the second control circuit, and in that the control means are able to generate a voltage drop across the second control line when the second module is diagnosed to have failed.

22. The automotive vehicle headlamp according to claim 13, wherein the first light function is a style function.

23. The automotive vehicle headlamp according to claim 14, wherein the second light function is a preset illuminating and/or signaling function, especially a daytime running light function.

24. The automotive vehicle headlamp according to claim 16, wherein it comprises an electronic control unit (M) connected to the electrical connection device.

\* \* \* \* \*

UNITED STATES PATENT AND TRADEMARK OFFICE
CERTIFICATE OF CORRECTION

PATENT NO. : 8,907,566 B2  Page 1 of 1
APPLICATION NO. : 14/061969
DATED : December 9, 2014
INVENTOR(S) : Maria Marin Gonzalez et al.

It is certified that error appears in the above-identified patent and that said Letters Patent is hereby corrected as shown below:

In the claims

Claim 1, Column 7, line 7, delete "B-" before -one-.

Claim 15, Column 8, line 20, delete "a" after -headlamp-.

Signed and Sealed this
First Day of December, 2015

Michelle K. Lee
*Director of the United States Patent and Trademark Office*